United States Patent [19]
Tien Lin

[11] Patent Number: 5,826,493
[45] Date of Patent: Oct. 27, 1998

[54] INFUSION COFFEE MAKER

[75] Inventor: Yu-Mei Tien Lin, Taipei, Taiwan

[73] Assignee: Peo-Wu Tien

[21] Appl. No.: 963,805

[22] Filed: Nov. 4, 1997

[51] Int. Cl.[6] .................................................. A47J 31/02
[52] U.S. Cl. ................................. 99/306; 99/323; 99/299
[58] Field of Search ............................. 99/323, 306, 304, 99/317, 279, 299; 210/474, 477, 478, 479, 181

[56] References Cited

U.S. PATENT DOCUMENTS

| | | | |
|---|---|---|---|
| 2,732,787 | 1/1956 | Osborne | 99/306 |
| 4,986,172 | 1/1991 | Hunnicutt, Jr. | 99/306 |
| 5,664,480 | 9/1997 | DiFilippo | 99/306 X |

*Primary Examiner*—Reginald L. Alexander
*Attorney, Agent, or Firm*—A & J

[57] ABSTRACT

An infusion coffee maker includes a cover, a filter assembly, a drip cup, a retaining plate, and a stop. The drip cup has a central through hole at the bottom, and the filter assembly also has a through hole in the center. The bottom periphery of the drip cup extends downwardly to form an extended wall which is provided with spaced elongated holes and legs. The retaining plate includes a ferrule, a positioning rib element disposed inside and integrally connected to the ferrule, and spaced slots for receiving the legs of the drip cup. The ferrule is fitted below the drip cup within the space defined by the extended wall. The stop is inserted through the through holes of the drip cup into a hole in the center of the positioning rib element of the retaining plate. When the drip cup is placed on a planar surface, the ferrule slips downwardly along the elongated hole due to its own weight. A liquid such as coffee poured into the drip cup causes the stop to be tightly held in the through hole of the drip cup to avoid leakage. When the drip cup is placed on a container, the ferrule or the retaining plate at the bottom of the drip cup is pushed upwardly so that the stop disengages from the through hole of the drip cup to allow discharge of coffee into the container below.

3 Claims, 5 Drawing Sheets

INFUSION COFFEE MAKER

BACKGROUND OF THE INVENTION

1. Field of the Invention

This invention relates generally to an infusion maker, and more particularly to an infusion maker for making coffee and other drinks such as herbal drinks and tea while preserving the rich flavor of the coffee, herbs or tea leaves.

2. Description of the Prior Art

It has been found that instant coffee becomes increasingly popular after World War II. However, the coffee made by adding hot water to coffee powder is not rich in fragrance. Hence, there is a need for a device which can be used for making coffee which is of rich aroma. Although the conventional coffee maker can achieve this purpose, it is necessary to use a filter to remove the dregs from the coffee before drinking thereby causing much inconvenience in use and therefore making it unfit for practical use.

Therefore, it is an object of the present invention to provide an infusion coffee maker which can obviate and mitigate the above-mentioned drawbacks.

SUMMARY OF THE INVENTION

This invention relates generally to an infusion maker, and more particularly to an infusion maker for making coffee and other drinks such as herbal drinks and tea while preserving the rich flavor of the coffee, herbs or tea leaves.

A primary object of the present invention is to provide an infusion maker which can be conveniently operated.

Another object of the present invention is to provide an infusion maker which allows quick discharge of liquid in the maker.

In order to achieve the aforementioned objects, the present invention essentially comprises a drip cup, a filter assembly disposed inside the drip cup, a retaining plate fitted at the bottom of the drip cup, and a stop inserted into a bottom through hole of the drip cup and engaging a central portion of the retaining plate. When the drip cup is placed on a planar surface, the retaining plate at the bottom will slip downwardly of its own weight so that the stop closes the through hole of the drip cup tightly. When the drip cup is placed on top of a container, the retaining plate is pushed upwardly upon contact with the upper end of the container so that the stop disengages from the through hole of the drip cup to allow quick discharge of liquid into the container below.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
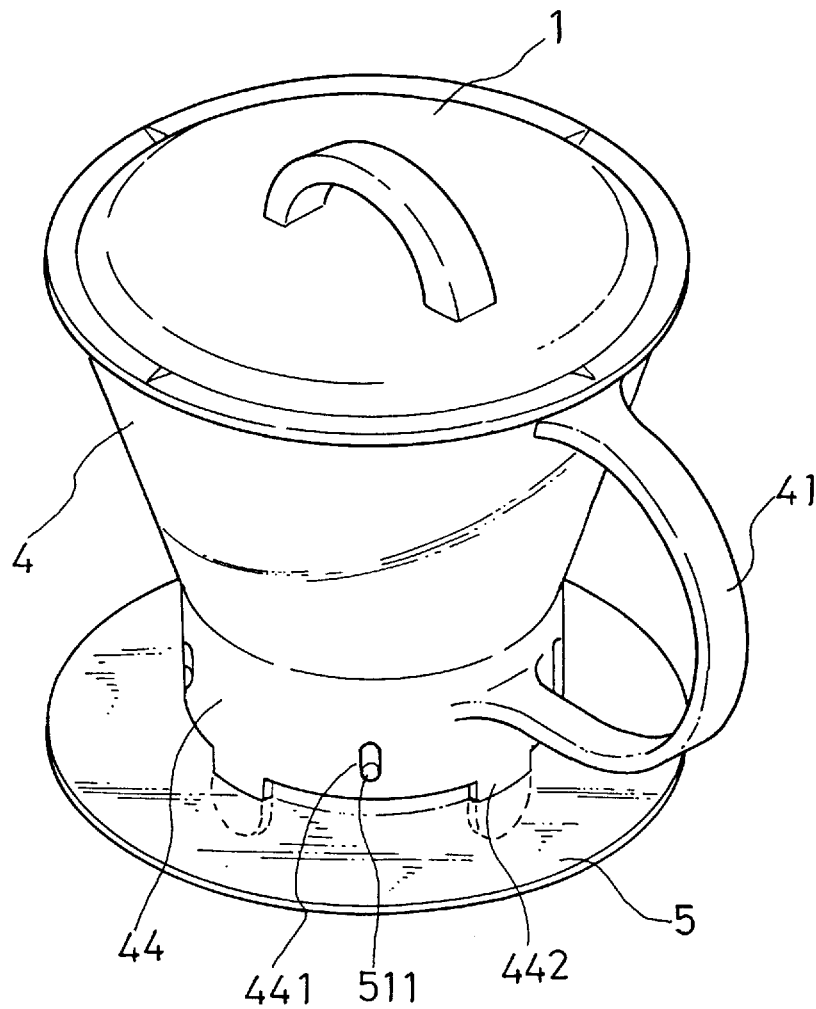
FIG. 1 is a perspective schematic view of the present invention.
Figure 2:
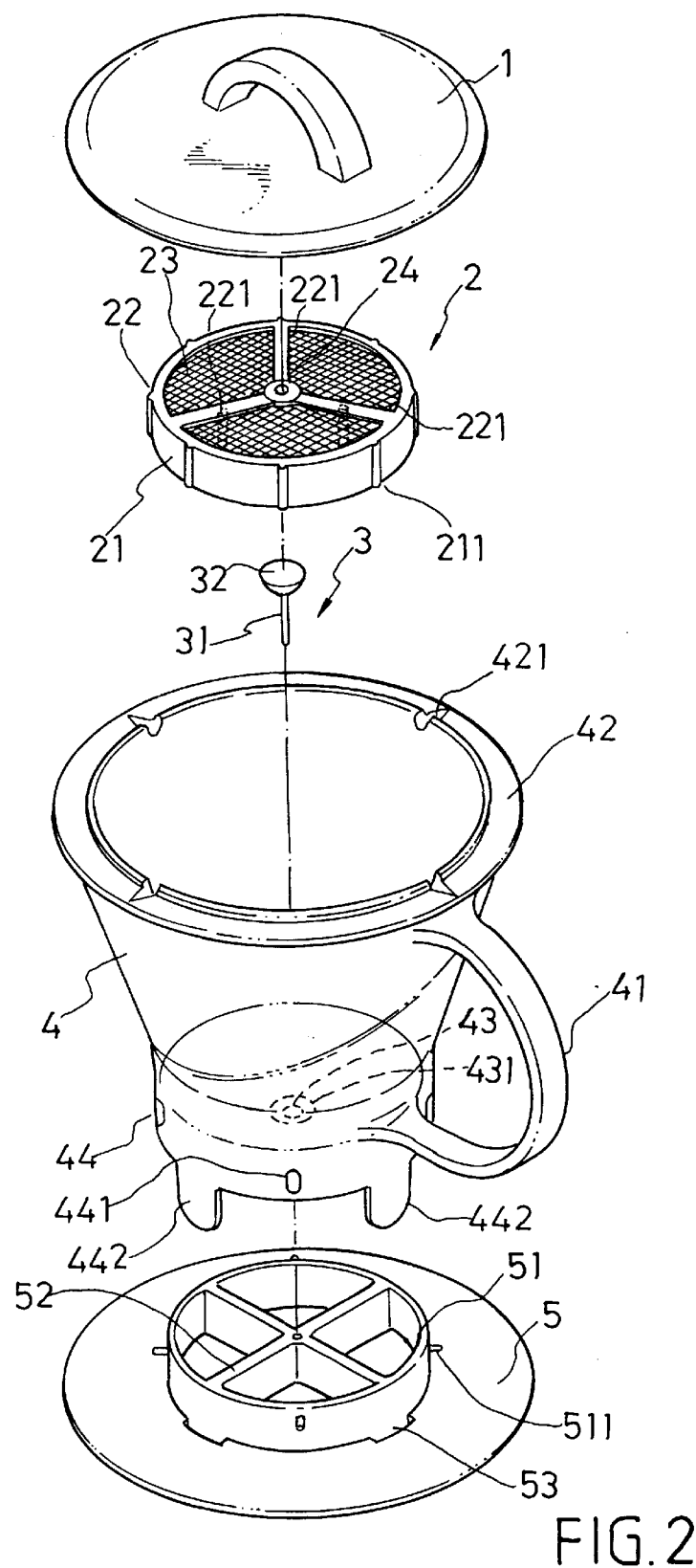
FIG. 2 is a perspective exploded schematic view of the present invention.
Figures 3, 3A:
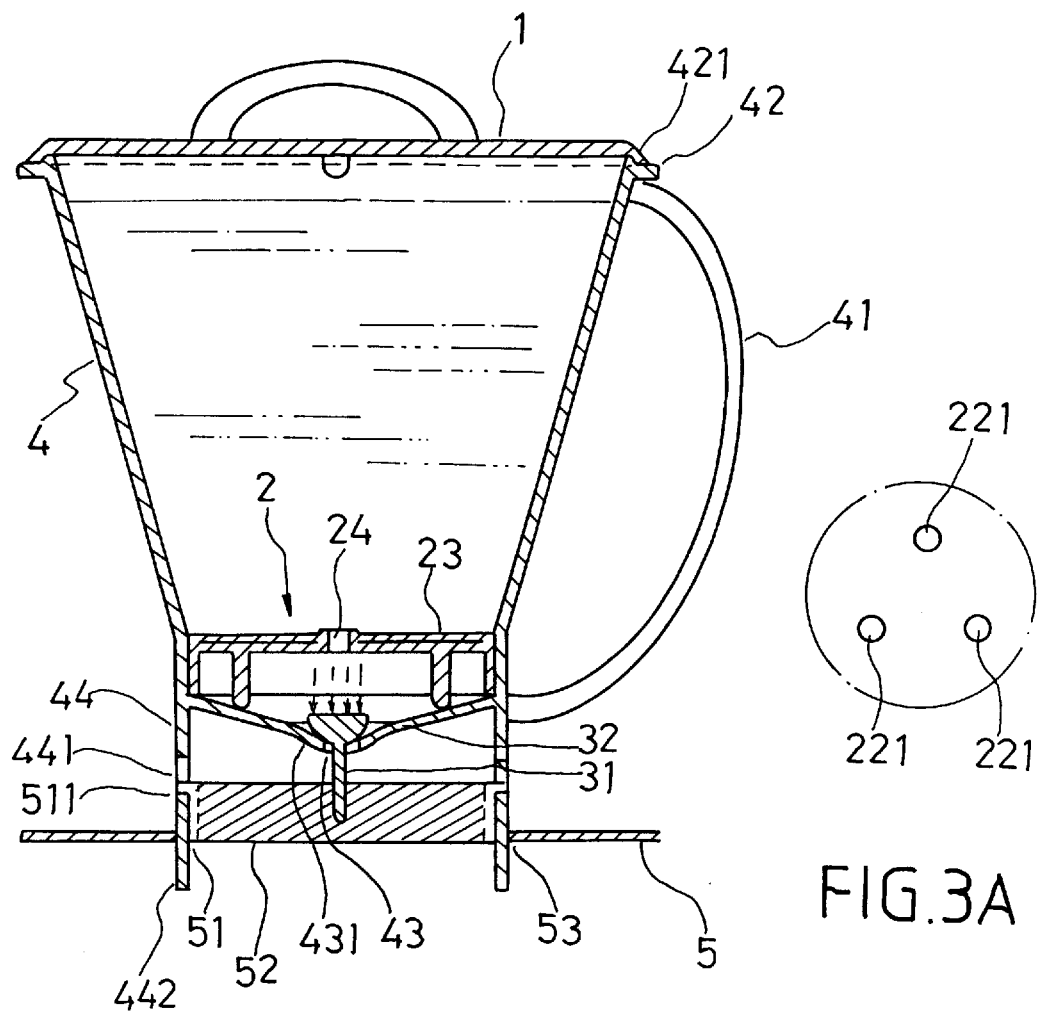
FIG. 3 is an assembled sectional view of the present invention, showing the downwardly displacement of the retaining plate of the present invention.
FIG. 3A illustrates the arrangement of the downwardly extending symmetrical posts on the bottom of the support frame.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIGS. 1, 2, 3 and 3A thereof, the present invention essentially comprises a cover 1, a filter assembly 2, a stop 3, a drip cup 4, and a retaining plate 5.

The drip cup 4 has a conical shape to allow fast discharge of coffee therefrom. The drip cup 4 includes a handle 41 at one side, and a retaining rim 42 at an upper end thereof. The retaining rim 42 is provided with a plurality of symmetrical spaced conical indentations 421 such that when the cover 1 is placed on top the drip cup 4, the conical indentations 421 allow communication with the ambient air so that there is convection of air to speed up discharge of coffee from the drip cup 4. The drip cup 4 further includes a through hole 43 at the center of its bottom side. The bottom side of the drip cup 4 is a conical inclined surface. Around the through hole 43 there is provided a conical shallow groove 431 of a different inclination from that of the bottom side so that coffee in the drip cup 4 may flow fast along the two different inclined surfaces through the through hole 431. The drip cup 4 further has an extended wall 44 extending from the outer peripheral surface of the bottom side thereof. The extended wall 44 is provided with a plurality of symmetrically arranged vertical elongated holes 441 thereon. The extended wall 44 further extends downwardly to form a plurality of symmetrical legs 442 so that the drip cup 4 may stably placed on a flat surface.

The filter assembly 2 includes an annular body 21, a support frame 22 connected to the annular body 21, and a mesh element 23 mounted on the annular body 21 and the support frame 22. The annular body 21 is provided with a plurality of ribs 211 on its outer periphery. By means of the ribs 211, the filter assembly 2 may be directly fitted into the drip cup 4 below. The support frame 22 is provided with a plurality of downwardly extending symmetrical posts 221 thereon, for contacting the bottom side of the drip cup 4 so as to effectively support the mesh element 23 and prevent the filter assembly 2 from being deformed under the pressure of water. The filter assembly 2 as a whole is easily detachable for cleaning. The support frame 22 further has a central through hole 24 adapted to enhance the flow of air to speed up discharge of coffee from the drip cup 4. The retaining plate 5 has a suitable diameter. It is centrally provided with a ferrule 51 of a diameter slightly smaller than that of the extended wall 44 of the drip cup 4. The ferrule 51 is integrally connected to the four rib portions of a cross-shaped positioning rib element 52 disposed therewithin and is provided with peripheral retaining posts 511 projecting outwardly. The positioning rib element 52 further has a hole at the center. When the ferrule 51 is fitted into the space defined by the extended wall 44 of the drip cup 4, the retaining posts 511 are retained in the elongated holes 441. It should be appreciated that the drip cup 4 and the ferrule 51 are both made of plastic materials such as PC to allow them to elastically deform when the ferrule 51 is squeezed within the extended wall 44. Furthermore, the elongated hole 441 receiving the retaining posts 551 allow the ferrule 51 to displace upwardly and downwardly within the extended wall 44 to a certain extent yet preventing it to turn sideways. The retaining plate 5 is further provided with a plurality of slots 53 for passage of the legs 442 of the drip cup 4 therethrough so as to maintain a certain a distance between the retaining plate 5 and the surface on which the coffee make is placed.

The stop 3 includes a stem portion 31 and a hemispherical portion 32 (alternatively, a spherical portion). The stem portion 31 is inserted via the through hole 43 of the drip cup 4 and into the hole of the positioning rib element 52 of the retaining plate 5.

Figure 4:
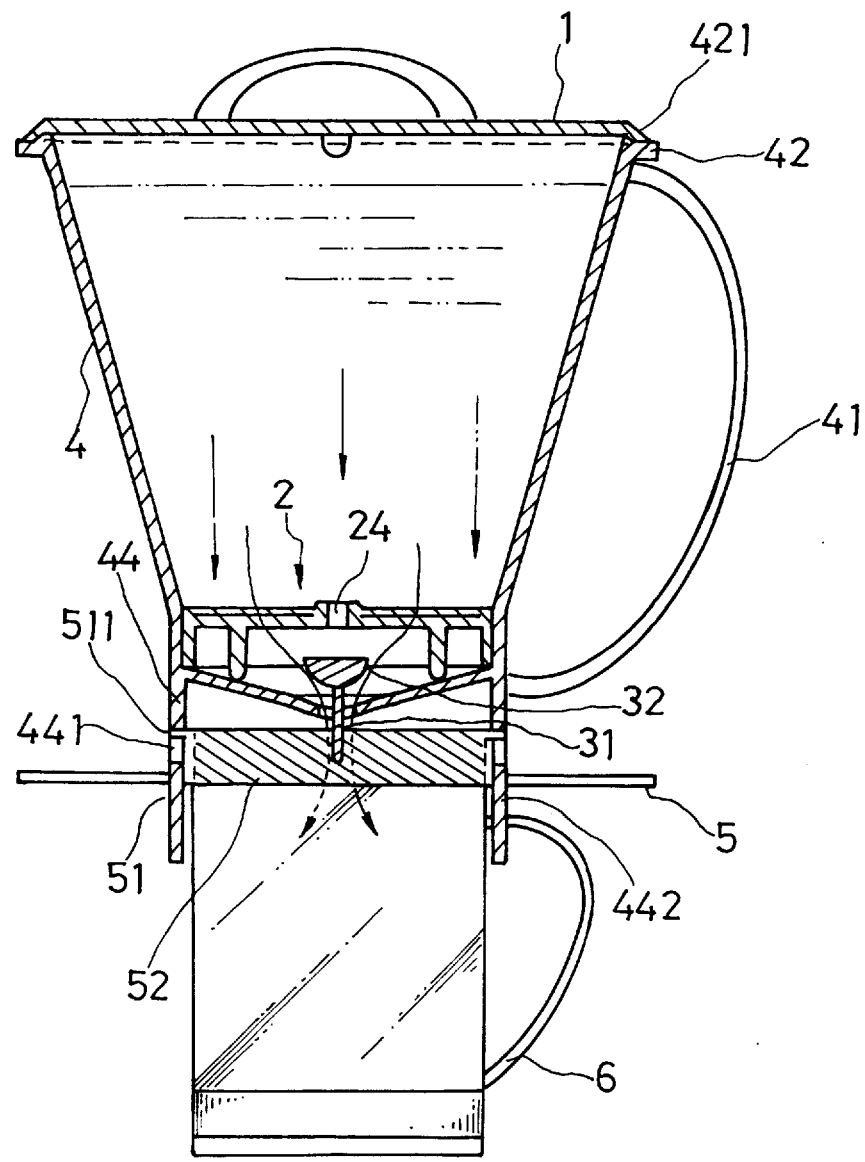
FIGS. 4 and 5 are schematic views illustrating the present invention placed on top of containers of different sizes.

Referring to FIG. 4, when in use, the drip cup 4 is placed on a planar surface. The ferrule 51 then slips downwardly along the elongated hole 441 of its own weight, while the retaining plate 5 is supported by the legs 442 of the drip cup 4 so that it is not in contact with the planar surface. The stop 3 is plugged into the through hole 43 of the drip cup 4, and coffee is poured into the drip cup. Due to the pressure exerted by the coffee on the hemispherical portion 32 of the stop 3 which has a relatively larger pressure bearing area than ordinary spherical bodies, the stop 3 can positively avoid coffee leakage.

Figure 5:
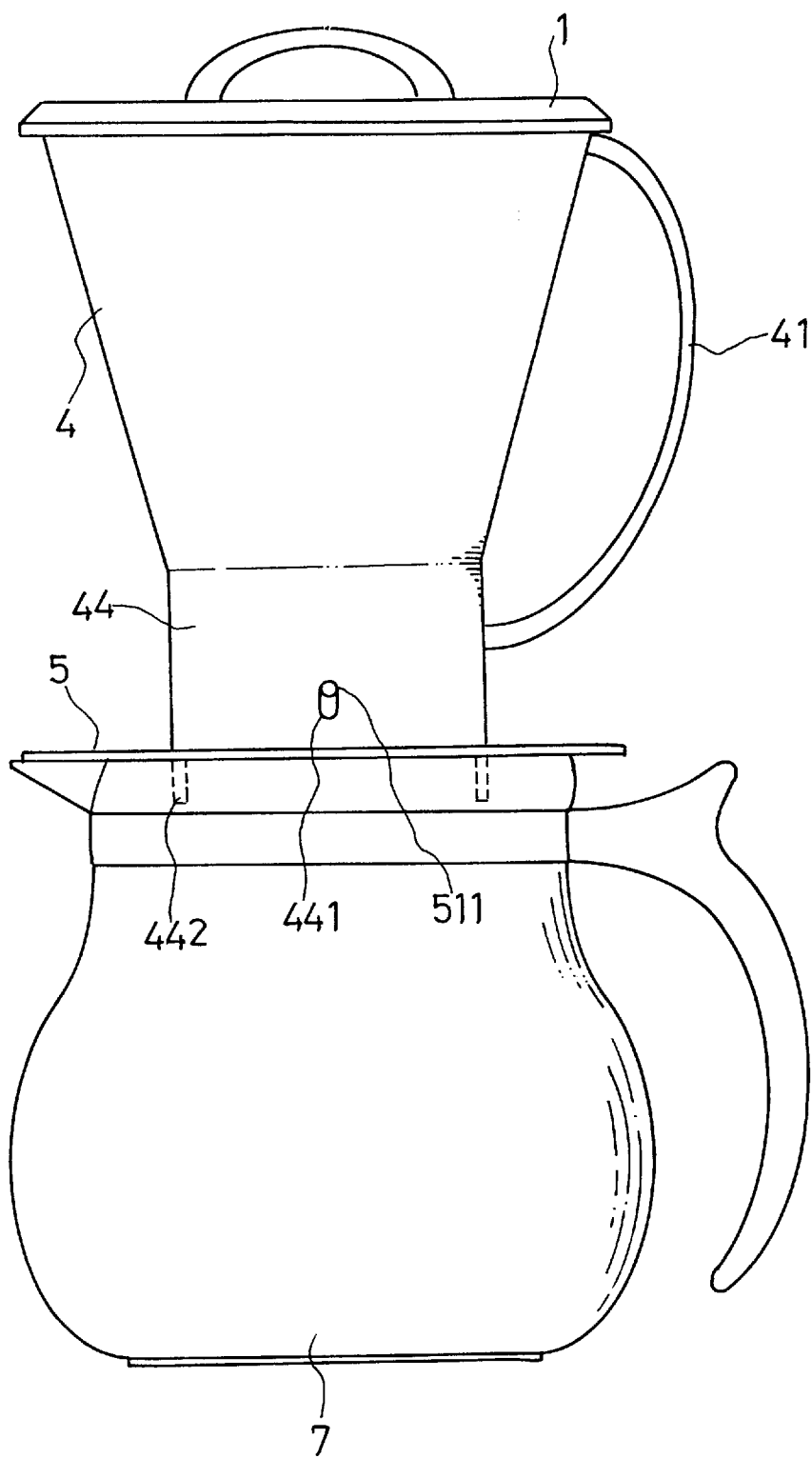

Referring to FIGS. 4 and 5, when the drip cup 4 is placed on top of container 6 or 7 of different sizes, the positioning rib element 52 or the retaining plate 5 at the bottom of the drip cup 4 will be pushed upwardly on contact with the upper end of the container 7 so that the hemispherical portion 32 of the stop 3 disengages from the through hole 43 of the drip cup 4 to allow discharge of coffee via the through hole 43 and the spaces defined by the rib portions of the positioning rib element 52 into the container 7 below ready for serving.

It should be appreciated that the present invention can be used to make various kinds of herbal drinks, tea, etc.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An infusion coffee maker, comprising:

a drip cup, being substantially conical in shape and having a bottom side, said bottom side being conical and having a through hole in the center thereof, said drip cup further having a extended wall extending from the periphery of said bottom side, said extended wall being circumferentially provided with a plurality of spaced, vertically elongated holes and having a plurality of spaced legs extending from the bottom end thereof;

a filter assembly, including an annular body, a support frame connected to said annular body, and a mesh element mounted on said annular body and said support frame, said annular body being provided with a plurality of ribs on the outer periphery thereof;

a retaining plate, including a ferrule of a diameter slightly smaller than that of the extended wall, a positioning rib element disposed within said ferrule such that rib portions of said positioning rib element are integrally connected to the inner periphery of said ferrule, said positioning rib element having a hole in the center, said ferrule having a plurality of retaining posts on the outer periphery, and said retaining plate further having a plurality of slots for receiving said legs of said drip cup; and a stop, including a stem portion and a hemispherical portion, said stem portion being inserted through said through hole of said drip cup into said hole of said positioning rib element, whereby said ferrule is fitted within a space defined said extended wall at the bottom of said drip cup and retained therein by means of said retaining posts engaging said elongated hole such that when said drip cup is placed on a planar surface, said ferrule, of its own weight, slips downwardly along said elongated holes and said stop closes said through hole of said drip cup, the pressure of a liquid poured into said drip cup exerting a pressure on said hemispherical portion of said stop so that liquid leakage is avoid, said retaining plate or said positioning rib element being caused to move upwardly when said drip cup is placed on top of a container so that said stop disengages from said through hole of said drip cup to allow discharge of the liquid inside said drip cup into the container below.

2. The infusion coffee maker as claimed in claim 1, wherein said through hole at said bottom side of said drip cup is surrounded by a conical shallow groove so that the liquid inside said drip cup may be discharged faster.

3. The infusion coffee maker as claimed in claim 1, wherein said stop includes a stem portion and a spherical portion.

* * * * *

UNITED STATES PATENT AND TRADEMARK OFFICE
CERTIFICATE OF CORRECTION

PATENT NO. : 5,826,493
DATED : October 27, 1998
INVENTOR(S) : Yu-Mei Tien Lin

It is certified that error appears in the above-identified patent and that said Letters Patent is hereby corrected as shown below:

<u>Title page,</u>
Item [75], Inventor, should read:
-- Peo-Wu Tien and Yu-Mei Tien Lin,
both of Taipei, Taiwan --.

Signed and Sealed this

Thirty-first Day of January, 2006

JON W. DUDAS
*Director of the United States Patent and Trademark Office*